(12) United States Patent
Ochiai et al.

(10) Patent No.: US 9,912,893 B2
(45) Date of Patent: Mar. 6, 2018

(54) DRIVING METHOD FOR AN IMAGE PICKUP APPARATUS

(71) Applicant: CANON KABUSHIKI KAISHA, Tokyo (JP)

(72) Inventors: Kei Ochiai, Inagi (JP); Tetsuya Itano, Sagamihara (JP); Mineo Uchida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/082,860

(22) Filed: Mar. 28, 2016

(65) Prior Publication Data

US 2016/0344968 A1 Nov. 24, 2016

(30) Foreign Application Priority Data

May 19, 2015 (JP) .................................. 2015-102132

(51) Int. Cl.
*H04N 5/376* (2011.01)
*H04N 5/369* (2011.01)

(52) U.S. Cl.
CPC ......... *H04N 5/3765* (2013.01); *H04N 5/3696* (2013.01)

(58) Field of Classification Search
CPC ..... H04N 5/3765; H04N 5/3696; H04N 5/378
See application file for complete search history.

(56) References Cited

U.S. PATENT DOCUMENTS

| | | | |
|---|---|---|---|
| 6,933,978 B1 * | 8/2005 | Suda .................. | G02B 7/34 348/345 |
| 9,554,068 B2 | 1/2017 | Ohshitanai | |
| 2013/0265256 A1 * | 10/2013 | Nathan ............... | G06F 3/0414 345/173 |

FOREIGN PATENT DOCUMENTS

JP 2001124984 A 5/2001

* cited by examiner

*Primary Examiner* — Twyler Haskins
*Assistant Examiner* — Angel L Garces-Rivera
(74) *Attorney, Agent, or Firm* — Canon USA, Inc., IP Division

(57) ABSTRACT

A driving method for an image pickup apparatus includes accumulating a signal generated during a first charge accumulation period by a first sub pixel, accumulating a signal generated during a second charge accumulation period partially overlapped with the first charge accumulation period by a second sub pixel, and controlling column circuits such that, after processing of the signal generated during the first charge accumulation period is performed, processing of the signal is performed which is generated during the second charge accumulation period of the second sub pixel included in the pixel where the signal processing of the first sub pixel is performed, and the column circuits are put into a non-operating state during at least part of a period after the processing of the signal generated during the first charge accumulation period is ended until the second charge accumulation period is ended.

17 Claims, 13 Drawing Sheets

DRIVING METHOD FOR AN IMAGE PICKUP APPARATUS

BACKGROUND OF THE INVENTION

Field of the Invention

The present invention relates to a driving method for an image pickup apparatus by using an image pickup apparatus including a plurality of photoelectric conversion units for each pixel.

Description of the Related Art

More functions have been realized in an image pickup apparatus such as a CMOS sensor in recent years. Control such as focus detection in the image pickup apparatus is also being performed based on the object information obtained by the image pickup apparatus, for example.

Japanese Patent Laid-Open No. 2001-124984 discloses a technology with which focus detection based on a pupil division method can be performed by using a signal obtained from a pixel array. In an image pickup apparatus described in Japanese Patent Laid-Open No. 2001-124984, each pixel in the pixel array is provided with one micro lens and two photoelectric conversion units. The respective photoelectric conversion units receive lights that have passed through different pupil regions. The focus detection and image pickup are performed by using signals of these photoelectric conversion units.

In addition, Japanese Patent Laid-Open No. 2001-124984 discloses a configuration in which pixel rows used for focus detection processing and image forming processing and pixel rows used only for the image forming processing are separately used.

SUMMARY OF THE INVENTION

According to an aspect of the present invention, there is provided a driving method for an image pickup apparatus that includes a plurality of pixel columns each including a plurality of pixels each including a first sub pixel and a second sub pixel, and a plurality of column circuits each configured to process a signal output from each of the plurality of pixel columns, the method including accumulating a signal generated during a first charge accumulation period by the first sub pixel, accumulating a signal generated during a second charge accumulation period partially overlapped with the first charge accumulation period by the second sub pixel, and controlling the plurality of column circuits such that, after processing of the signal generated during the first charge accumulation period is performed, processing of the signal is performed which is generated during the second charge accumulation period of the second sub pixel included in the pixel where the signal processing of the first sub pixel is performed, and the plurality of column circuits are put into a non-operating state during at least part of a period after the processing of the signal generated during the first charge accumulation period is ended until the second charge accumulation period is ended.

Further features of the present invention will become apparent from the following description of exemplary embodiments with reference to the attached drawings.

DESCRIPTION OF THE EMBODIMENTS

An exemplary embodiment of the present invention will be described in detail with reference to FIGS. 1 to 8. Then, respective examples using the exemplary embodiment will be described with reference to FIGS. 9A, 9B, and 9C to 13.

Figure 1:
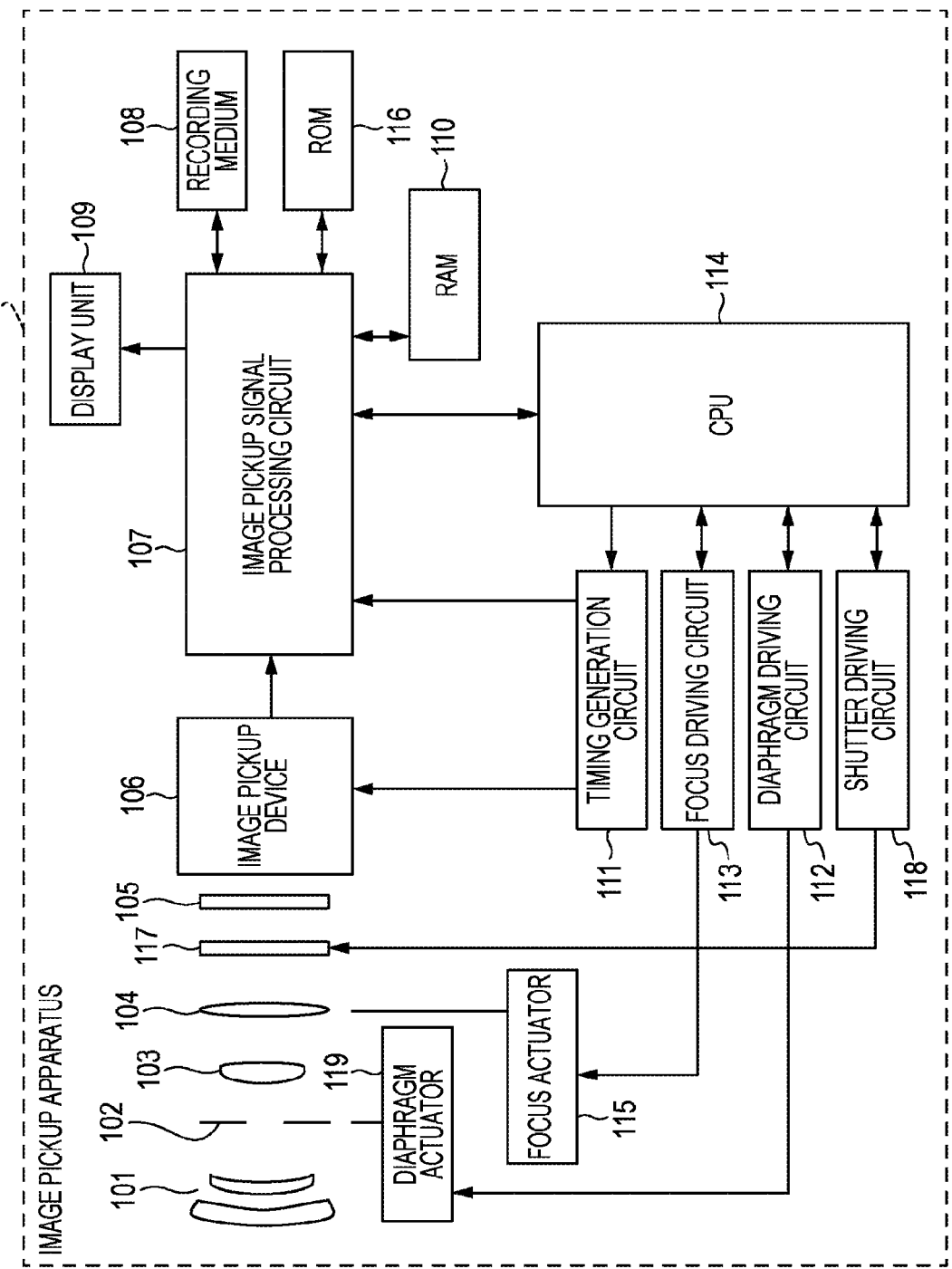
FIG. 1 is an overall configuration diagram of an image pickup apparatus.

FIG. 1 illustrates an example overall configuration of an image pickup apparatus 100 according to the present exemplary embodiment. In FIG. 1, a first lens group 101 arranged at the leading edge of a focusing optical system is held retractably in an optical axis. An opening diameter of a diaphragm 102 is adjusted to perform light amount adjustment at the time of image pickup. A second lens group 103 realizes a variable power action (zooming function) in conjunction with a retracting operation of the first lens group 101. A third lens group 104 performs focus adjustment by retracting movement in the optical axis.

An optical low-pass filter 105 is an optical element used for suppressing false color or moire of a photographed image. An image pickup device 106 performs photoelectric conversion (image pickup) of an object image focused by the above-described lens groups to generate an image pickup signal (pixel signal). Herein, a CMOS image sensor having Bayer array is used as the image pickup device 106.

An image pickup signal processing circuit 107 performs various corrections on the image signal output from the image pickup device 106 and compresses data. The image pickup signal processing circuit 107 also performs auto focus (AF) calculation to calculate a focus misalignment amount from image data.

A recording medium 108 records the image data. A display unit 109 displays the photographed image, various menu screens, and the like. For example, a liquid crystal display (LCD) or the like is used as the display unit 109.

A RAM 110 temporarily stores the image data and the like. The RAM 110 is connected to the image pickup signal processing circuit 107. A ROM 116 stores various correction data and the like.

A timing generation circuit 111 supplies a driving signal to the image pickup device 106. A diaphragm driving circuit 112 drives and controls a diaphragm actuator 119 to drive the diaphragm 102. A focus driving circuit 113 drives and controls a focus actuator 115 to perform the retracting movement of the third lens group 104 in the optical axis direction for the focus adjustment.

A mechanical shutter 117 controls the exposure amount to the image pickup device 106 at the time of still image photographing. The mechanical shutter 117 maintains an opening state at the time of live view operation or shooting of a moving image and is in a state of keeping the image pickup device 106 exposed. A shutter driving circuit 118 controls the mechanical shutter 117.

A CPU 114 controls the image pickup signal processing circuit 107, the timing generation circuit 111, the diaphragm driving circuit 112, the focus driving circuit 113, and the shutter driving circuit 118. It should be noted that the CPU 114 controls the focus driving circuit 113 based on an AF calculation result of the image pickup signal processing circuit 107. These controls are realized while the CPU 114 reads out control programs stored in the ROM 116 or a memory that is not illustrated in the drawing executes the control programs.

Figure 2:
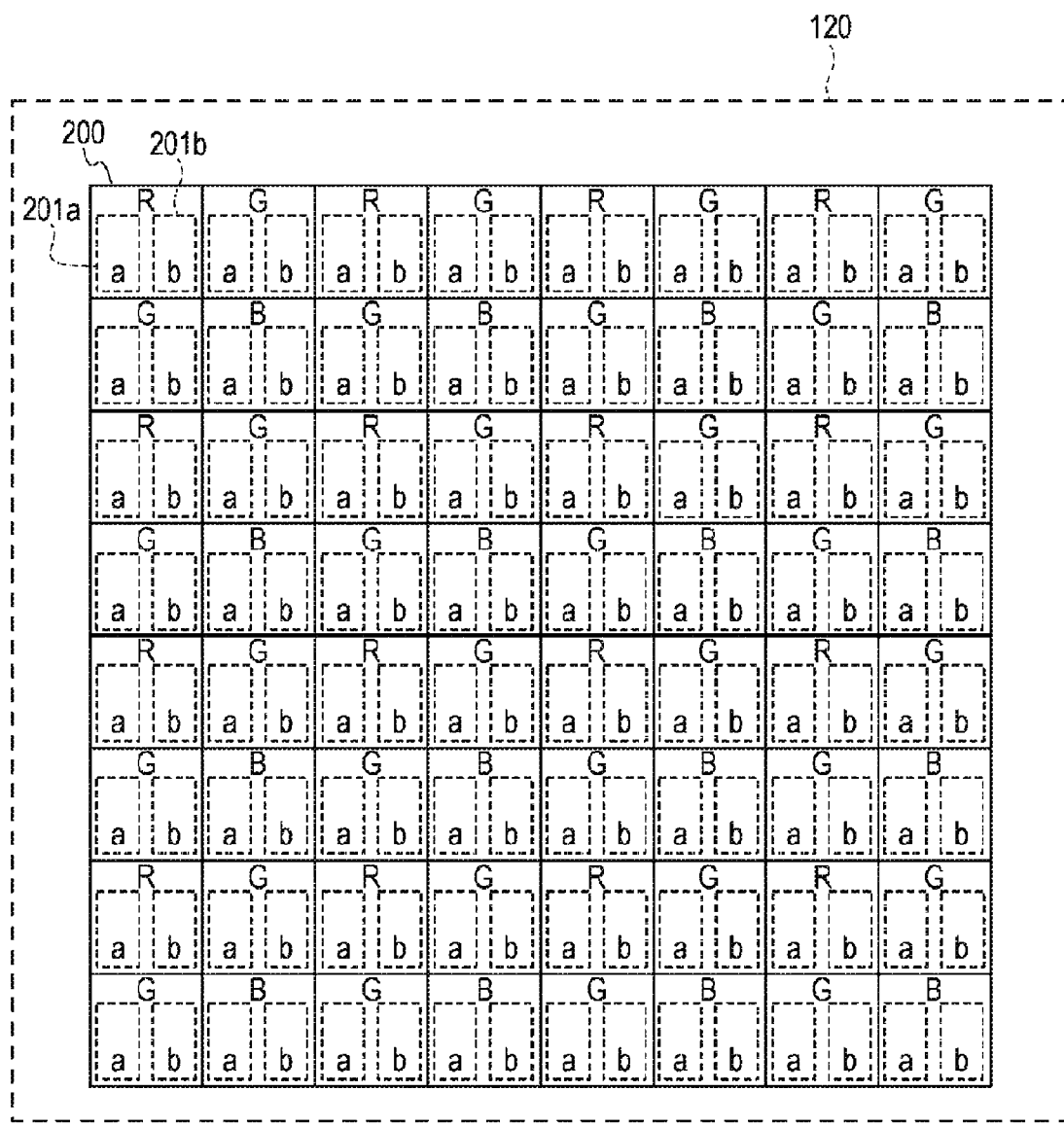
FIG. 2 is a schematic diagram of the image pickup apparatus.

FIG. 2 schematically illustrates a pixel array 120 of the image pickup device 106. The pixel array 120 is a region where the pixels 200 are arranged in rows and columns (two-dimension). Color filters of red (R), green (G), and blue (B) are arranged in the respective pixels 200 to form the Bayer array. The pixel 200 includes a first sub pixel 201a and a second sub pixel 201b. Each of the first sub pixel 201a and the second sub pixel 201b includes a photoelectric conversion unit. In FIG. 2, a photodiode (hereinafter, referred to as a PD) is used as an example of the photoelectric conversion unit. A signal of each of the first sub pixel 201a and the second sub pixel 201b can be used for the focus detection. In addition, a signal obtained by adding the signal of the first sub pixel 201a to the signal of the second sub pixel 201b can be used for the image formation.

Figure 3:
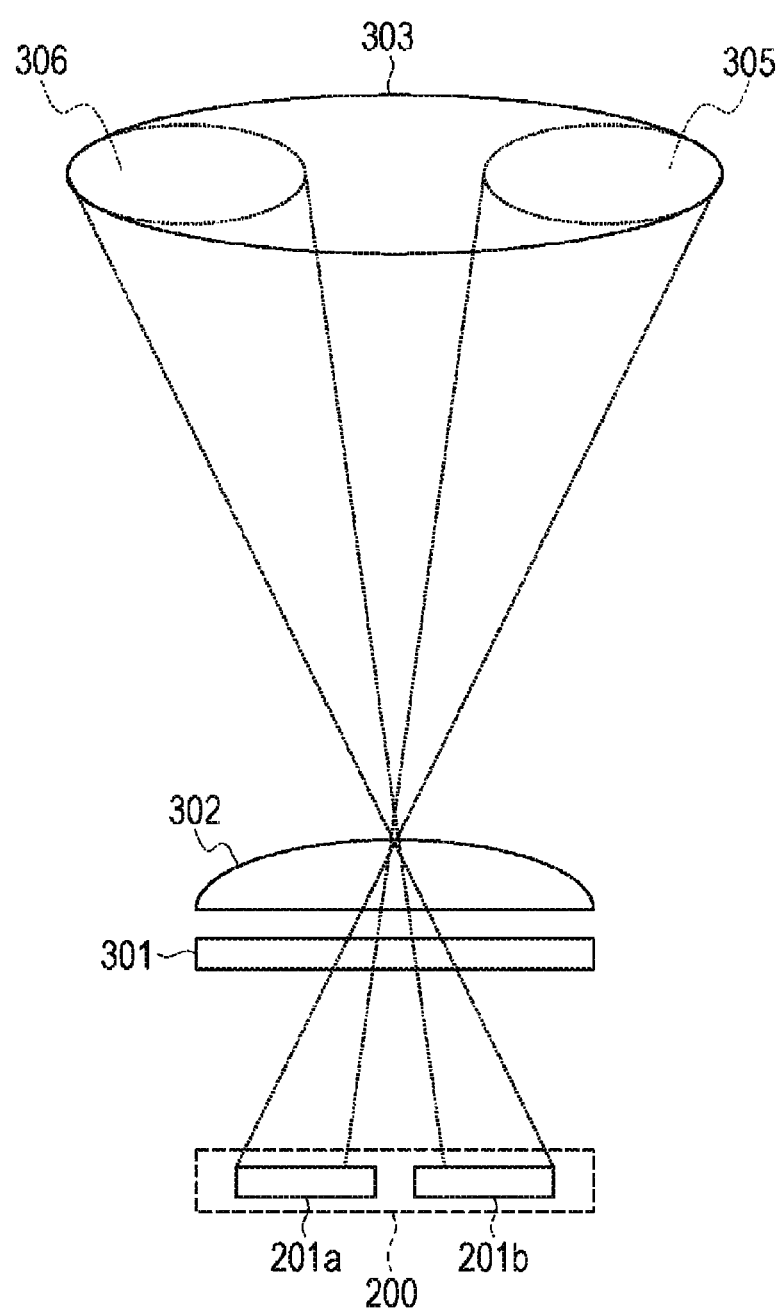
FIG. 3 is a schematic diagram of a relationship between light flux emitted from an ejection pupil of a photographing lens and a pixel.

FIG. 3 is a schematic diagram of a relationship between light flux emitted from an ejection pupil of a photographing lens constituted by the first to third lens groups 101, 103, and 104 and the diaphragm 102 and the pixel 200. In FIG. 3, same reference symbols are assigned to components similar to those in FIG. 2.

In FIG. 3, incident light passes through a micro lens 302 and a color filter 301, and the pixel 200 is irradiated with the incident light.

As illustrated in FIG. 3, light flux that has passed through a pupil region 305 is received by the first sub pixel 201a via the micro lens 302. Light flux that has passed through a pupil region 306 is received by the second sub pixel 201b via the micro lens 302. Therefore, the first sub pixel 201a and the second sub pixel 201b respectively receive lights of different pupil regions in an ejection pupil 303 of a photographing lens. For this reason, it is possible to perform focus detection based on a phase difference method by comparing output signals of the first sub pixel 201a and the second sub pixel 201b with each other.

Figure 4A:
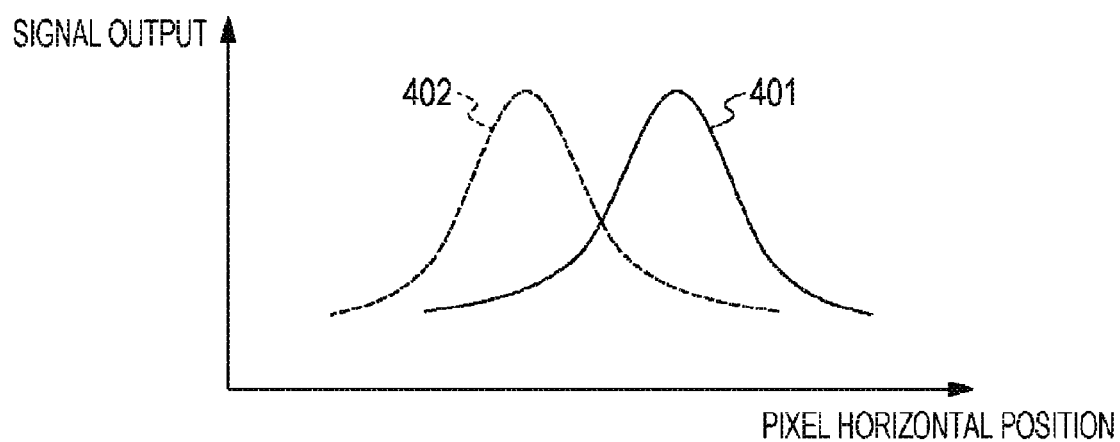
FIGS. 4A and 4B are explanatory diagrams for describing focus detection.
Figure 4B:
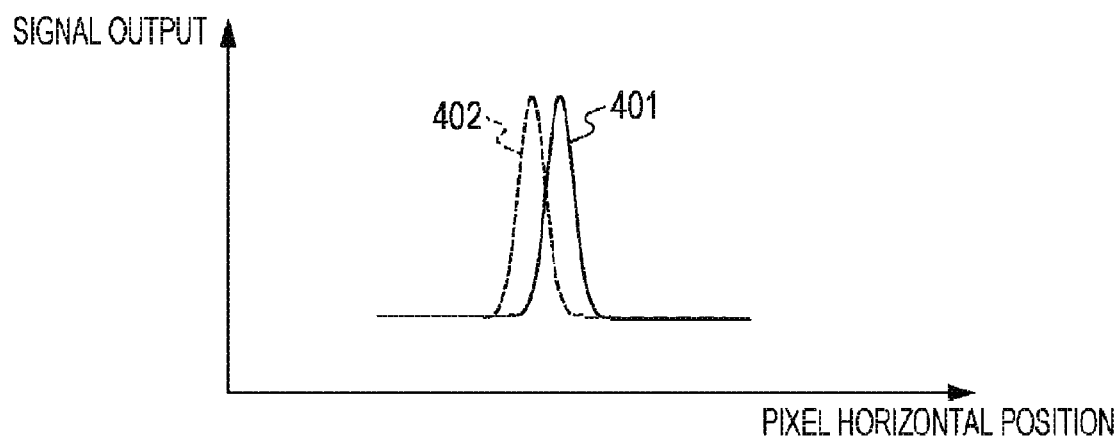

FIGS. 4A and 4B illustrate a correlation relationship between a signal waveform 401 obtained from the first sub pixel 201a and a signal waveform 402 obtained from the second sub pixel 201b in different focus states. In FIGS. 4A and 4B, a vertical axis represents a signal output, and a horizontal axis represents a horizontal position of the pixel. As illustrated in FIG. 4A, when a state is away from an in-focus state, peak positions of the signal waveform 401 obtained from the first sub pixel 201a and the signal waveform 402 obtained from the second sub pixel 201b are not matched with each other and are in a largely misaligned state. As illustrated in FIG. 4B, the state is close to the in-focus state, the misalignment of the peak positions of the signal waveform 401 and the signal waveform 402 is decreased, and the peak positions are overlapped with each other in the in-focus state. In this manner, a de-focus amount is detected from the misalignment amount of the signal waveform 401 and the signal waveform 402, and the focus adjustment can be performed.

Figure 5:
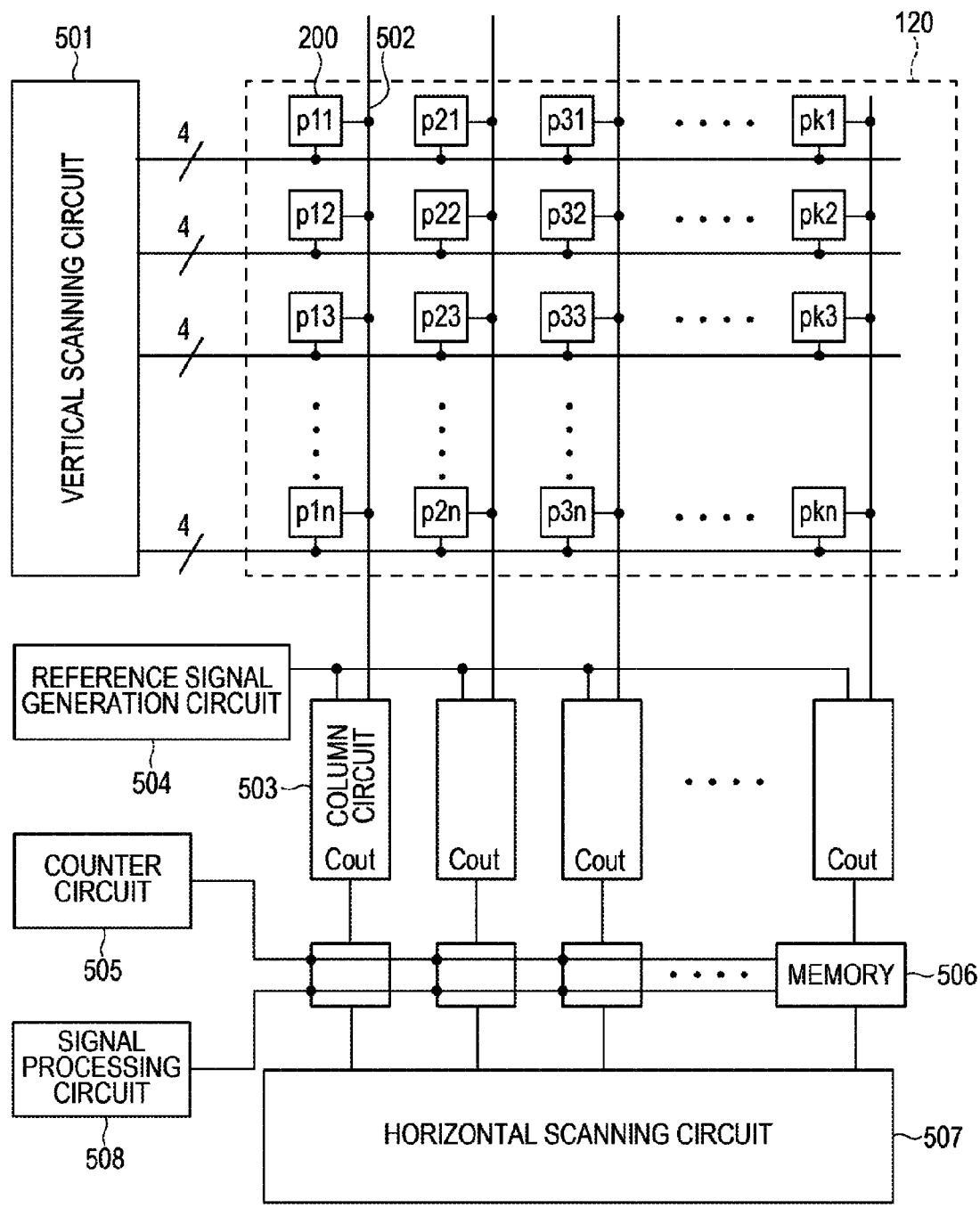
FIG. 5 is an overall configuration diagram of the image pickup apparatus.

FIG. 5 illustrates an overall configuration of the image pickup device 106. The pixels 200 are arranged in rows and columns (n rows and k columns) in the pixel array 120. In FIG. 5, an address of each pixel, specifically, for example, a pixel arranged in row n and column k is denoted as pkn.

A vertical scanning circuit 501 supplies driving signals pRES, pTXa, pTXb, and pSEL for controlling the transistors of the respective pixels 200. These driving signals are common for each pixel row.

The signals of the respective pixels 200 are connected to a column circuit 503 arranged in each of the plurality of pixel columns via a signal line 502 connected to each of the pixel columns. The respective column circuits 503 process the signals output from the respective pixel columns.

A reference signal generation circuit 504 supplies a reference voltage to circuits constituting the plurality of column circuits 503. A plurality of memories 506 arranged for the respective pixel columns are supplied with a count clock from a counter circuit 505. The memory 506 holds a signal in accordance with this count clock.

Pieces of digital data stored in the memories 506 are sequentially transferred by a horizontal scanning circuit 507 to a signal processing circuit 508 for each pixel column. According to a series of operations related to the readout of the signals from the pixels 200, the pixel rows in the pixel array 120 are sequentially selected by the vertical scanning circuit 501, and signals of an entire imaging plane are output.

Figure 6:
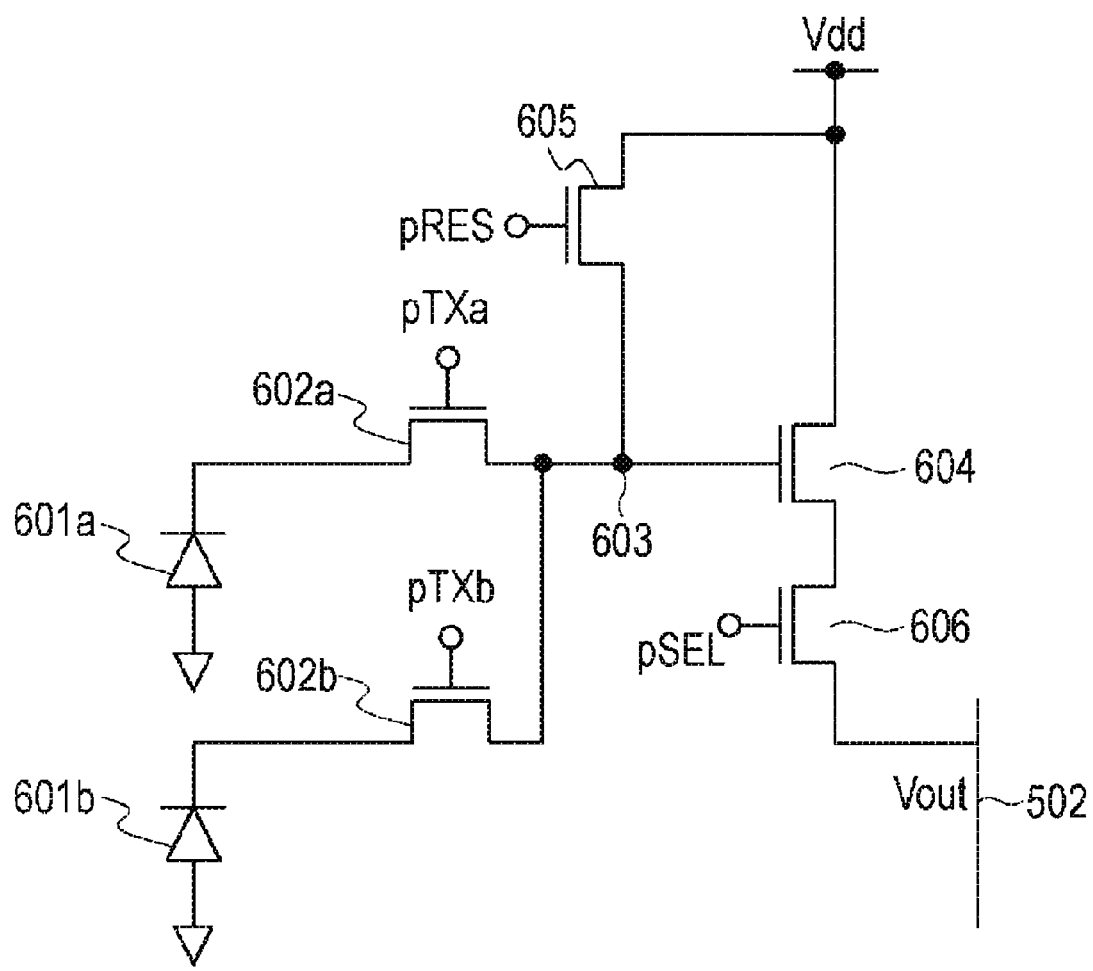
FIG. 6 is an equivalent circuit diagram of the pixel.

Next, a configuration of the pixel 200 will be described with reference to FIG. 6. In FIG. 6, a photoelectric conversion unit 601a and a photoelectric conversion unit 601b perform photoelectric conversion of the incident light and accumulate generated charges. The photoelectric conversion unit 601a is included in the first sub pixel 201a, and the photoelectric conversion unit 601b is included in the second sub pixel 201b.

Gates of the transfer transistor 602a and a transfer transistor 602b are supplied with the driving signals pTXa and pTXb, and operations are controlled by the driving signals pTXa and pTXb. For example, when the driving signals pTXa and pTXb turn to a High level, the charges accumulated in the photoelectric conversion unit 601a and the photoelectric conversion unit 601b are transferred to a floating diffusion (hereinafter, will be referred to as an FD). The FD 603 is connected to a gate of an amplification transistor 604, and the amplification transistor 604 amplifies signals based on the charges transferred from the photoelectric conversion unit 601a and the photoelectric conversion unit 601b.

A reset transistor 605 resets the FD 603 when the driving signal pRES turns to the High level. In a case where the charges of the photoelectric conversion unit 601a and the photoelectric conversion unit 601b are reset, it is sufficient if the driving signal pRES, the driving signal pTXa, and the driving signal pTXb turn to the High level at the same time. In a case where an electronic shutter operation is performed, charge accumulation periods in the photoelectric conversion unit 601a and the photoelectric conversion unit 601b are started by this operation.

When the driving signal pSEL turns to the High level, the signal amplified by the amplification transistor 604 is output to the signal line 502 as the signal of the pixel 200 in a selection transistor 606.

It should be noted that the amplification transistor 604 may be connected to the signal line 502 without the provision of the selection transistor 606. In this case, a selecting state and a non-selecting state of the pixel are switched by switching a potential of a drain of the amplification transistor 604 or the gate of the amplification transistor 604.

Next, an example configuration of the column circuit 503 will be described with reference to FIG. 7. Descriptions will be given of a configuration in which the column circuit 503 includes the amplification circuit and an analog-to-digital conversion unit (hereinafter, will be referred to as an AD conversion unit).

Figure 7:
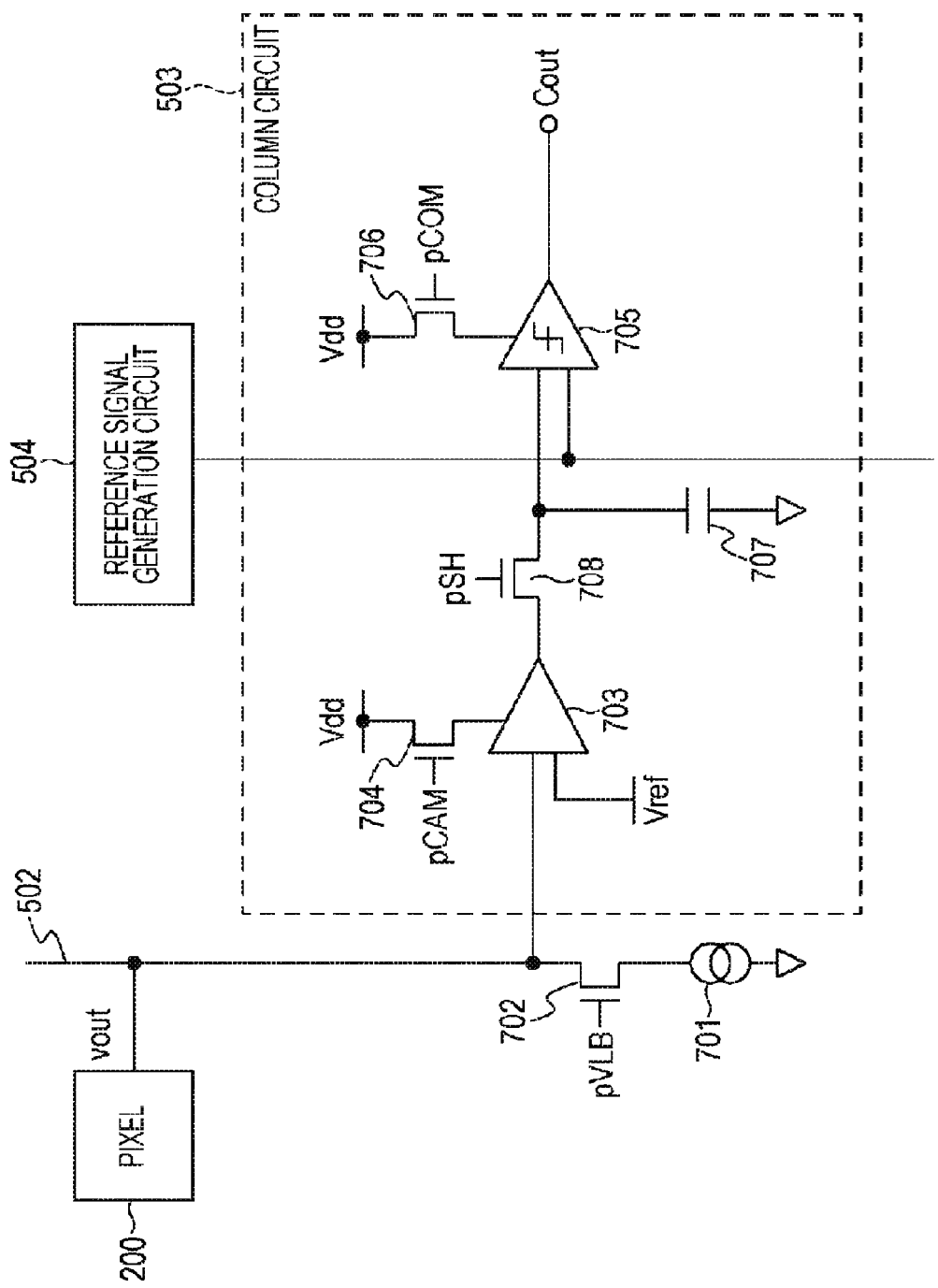
FIG. 7 is an equivalent circuit diagram of a column circuit.

In FIG. 7, a current source 701 supplies a bias current to the amplification transistor 604 of the pixel 200 via the signal line 502. A switch 702 is provided between the current source 701 and the signal line 502, a supply state and a non-supply state of the bias current are switched. The switch 702 is put into an ON state when a driving signal pVLB turns to the High level to establish a state in which the bias current flows. The switch 702 is put into an OFF state when the driving signal pVLB turns to a Low level to put the signal line and the current source into the non-selecting state. Accordingly, the supply state and the non-supply state are switched.

The column circuit 503 includes an amplification circuit. The amplification circuit includes a differential amplifier 703. The differential amplifier 703 performs amplification processing on a signal input from the signal line 502. A switch 704 controls the operation of the differential amplifier 703 to switch an operating state and a non-operating state of the differential amplifier 703. The switch 704 puts the differential amplifier 703 into the operating state when a driving signal pCAM turns to the High level.

The column circuit 503 includes the AD conversion unit. The AD conversion unit includes a comparator 705. A signal output from the differential amplifier 703 is input to one of input terminals of the comparator 705. More specifically, analog-to-digital conversion processing (hereinafter, will be referred to as an AD conversion processing) is performed on an analog signal held in a sampling and holding capacitance 707 to be compared with a reference signal output from the reference signal generation circuit 504, and a comparison result is output from an output node Cout. A switch 706 switches the operating state and the non-operating state of the comparator 705. The switch 706 puts the comparator 705 into the operating state when a driving signal pCOM turns to the High level.

The sampling and holding capacitance 707 holds a signal output from the differential amplifier 703. A switch 708 switches the selecting state and the non-selecting state of output nodes of the sampling and holding capacitance 707 and the differential amplifier 703. One terminal of the sampling and holding capacitance 707 switches the selecting state and the non-selecting state with the one input terminal of the comparator 705. The switch 708 is controlled by a driving signal pSH.

It should be noted that, although not illustrated in FIG. 5 and FIG. 7, driving signals are supplied from the control unit to the respective circuits.

Next, descriptions will be given of processing on signals output from the first sub pixel 201a and the second sub pixel 201b according to the present exemplary embodiment. Herein, an image signal A output from the first sub pixel 201a and an image signal AB corresponding to a combined signal of the image signal A output from the first sub pixel 201a and an image signal B output from the second sub pixel 201b will be described.

Figure 8:
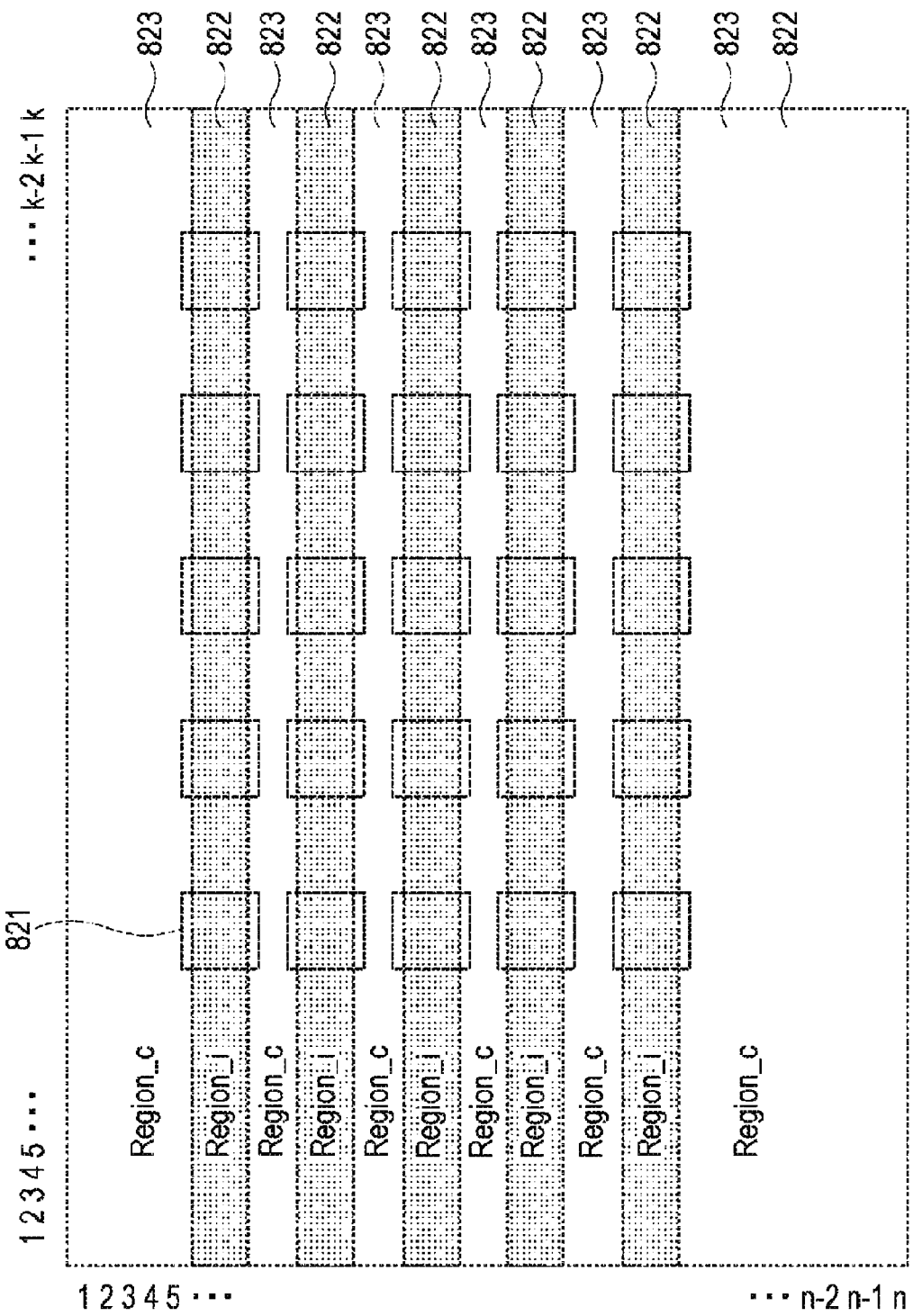
FIG. 8 is an explanatory diagram for describing a focusing frame that is set with respect to a pixel row array of the image pickup apparatus.

FIG. 8 illustrates a relationship between the pixel array 120 of the image pickup device 106 and a focusing frame 821 set in the pixel array 120 for performing the focus detection. The focusing frame 821 is set with respect to the image pickup signal processing circuit 107 by the CPU 114 described above, and generation of the driving signals by the timing generation circuit 111 is controlled. These settings are performed in accordance with setting data previously stored in the ROM 116, but a user may operate an operation member that is not illustrated in the drawing to perform the settings.

The image signal A of the first sub pixel 201a and the image signal AB obtained by adding the image signal A of the first sub pixel 201a to the image signal B of the second sub pixel 201b are output from the pixel in a first pixel row 822 included in a region Region_i.

Only the image signal AB obtained by adding the image signal A of the first sub pixel 201a to the image signal B of the second sub pixel 201b is output from the pixel in the pixel row included in a region Region_c. The image signal AB output from the pixel row included in the region Region_c is only used for the image generation and is not used for the focus detection.

It should be noted that, in a case where a plurality of regions Region_i are set in the vertical direction of the pixel array 120 as illustrated in FIG. 8, different numbers of the pixel rows in the respective regions may be set.

The descriptions have been given above on the image pickup apparatus commonly used in respective examples of the present invention. In the following examples, a driving method for the above-described image pickup apparatus will be described.

Example 1

A signal readout operation of the pixel rows in the region Region_i and the region Region_c will be described with reference to FIGS. 9A, 9B, and 9C. Charge accumulation periods of the pixels in the respective pixel rows are controlled by an electronic shutter operation. Specifically, the charge accumulation periods are controlled by a rolling shutter operation. The rolling shutter operation refers to an operation in which the charge accumulation period is started when the charges of the photoelectric conversion units of the respective pixels are reset, and after a predetermined period elapses, the charges from the photoelectric conversion units are transferred to the FD 603 to end the charge accumulation period. This charge accumulation period is set while being shifted for each pixel row.

Figure 9A:
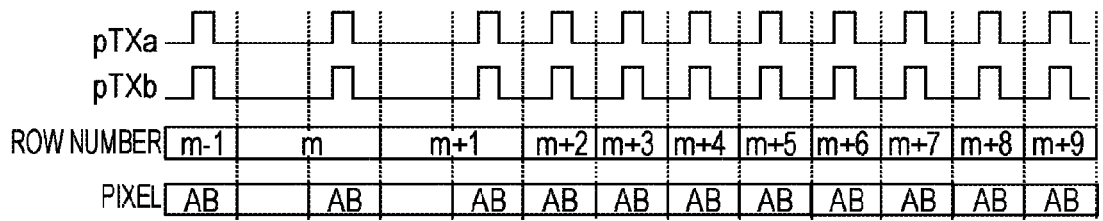
FIGS. 9A, 9B, and 9C are timing charts of a rolling shutter operation of the image pickup apparatus.

FIG. 9A illustrates reset operations in the respective pixel rows. During a period in which the driving signal pTXa for transferring the signal of the first sub pixel 201a and the driving signal pTXb for transferring the signal of the second sub pixel 201b are at the High level, the driving signal pRES of the reset transistor 605 is also at the High level. A row number indicates a pixel row to which the driving signals pTXa and pTXb are supplied during the period, and a column underneath it indicates a sub pixel in which the reset operation is performed. When AB is described, it is indicated that both the first sub pixel 201a and the second sub pixel 201b are reset.

Figure 9B:
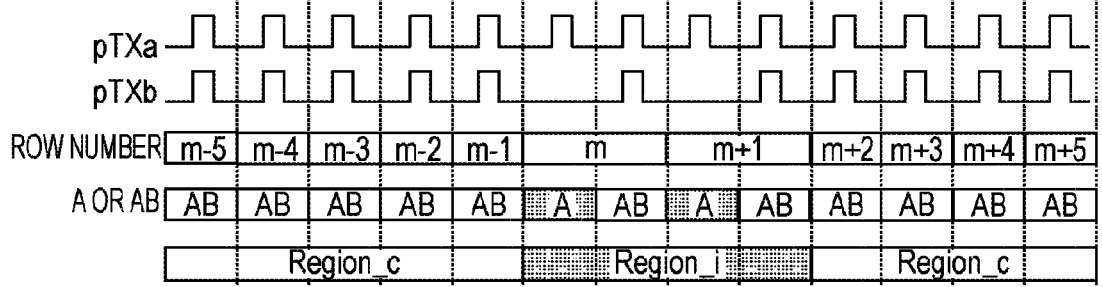

FIG. 9B illustrates output operation of the signals from the pixels in the respective pixel rows. When the driving signal pTXa for transferring the signal of the first sub pixel 201a and the driving signal pTXb for transferring the signal of the second sub pixel 201b turn to the High level, the signals of the corresponding sub pixels are transferred to the FD 603. During an output operation period, the driving signal pRES of the reset transistor 605 turns to the Low level during a period in which the driving signal pTXa and the driving signal pTXb turn to the High level.

Figure 9C:
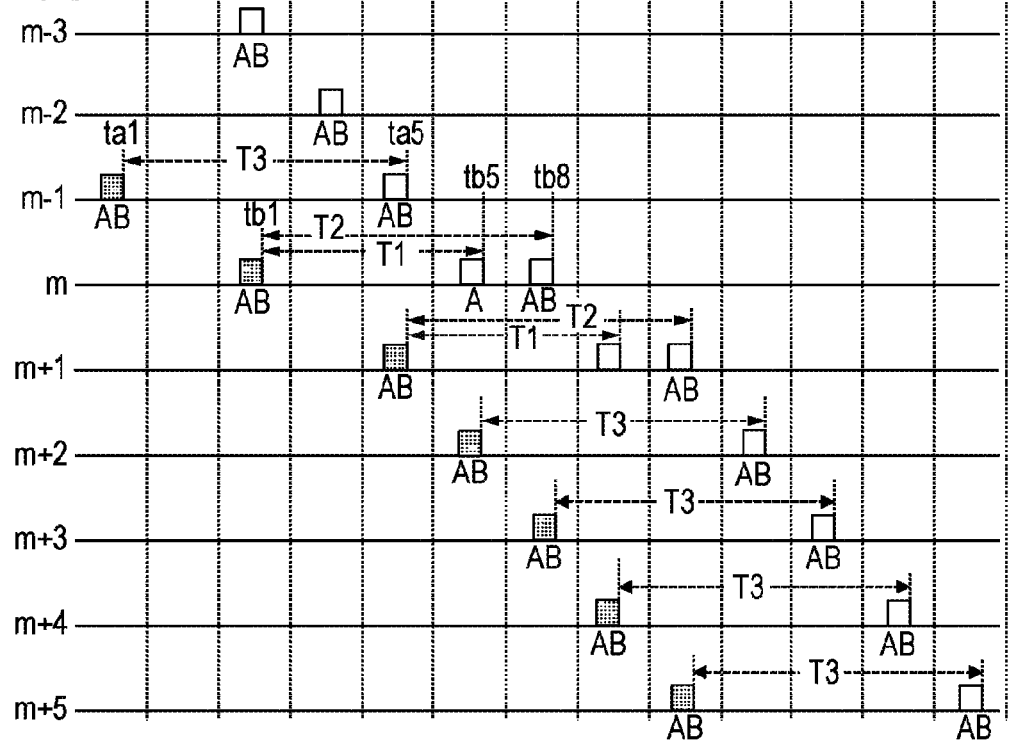

FIG. 9C illustrates transitions of the charge accumulation periods of the respective pixel rows, in which the charge accumulation periods of the respective pixel rows are sequentially set while being shifted from one another. In the operations in the respective pixel rows, a pulse represented by hatching indicates a reset operation of the charges accumulated in the photoelectric conversion units of the first sub pixel 201a and the second sub pixel 201b, and the reset operation is completed at the time of trailing edge of the pulse. After an elapse of a predetermined time T1, T2, or T3, a pulse that is not hatched is supplied. This pulse is the same as the driving signals pTXa and pTXb as illustrated in FIG. 9B and indicates the transfer of the charges accumulated in the first sub pixel 201a and the second sub pixel 201b. At the time of trailing edge of the driving signals pTXa and pTXb, the charge accumulation periods of the respective pixels are ended.

Herein, an operation of an m-th pixel row as a representative of the first pixel row 822 arranged in the region Region_i will be described. Similarly, an operation of an (m−1)-th pixel row as a representative of a second pixel row 823 arranged in the region Region_c will be described.

First, in the m-th pixel row, the reset operation of the first sub pixel 201a and the second sub pixel 201b is completed at a time tb1. Accordingly, a first charge accumulation period T1 corresponding to the charge accumulation period of the first sub pixel 201a and a second charge accumulation period T2 corresponding to the charge accumulation period of the second sub pixel 201b are started. It should be noted that the time tb1 is a time during a period in which an output operation in an (m−3)-th pixel row is performed. Subsequently, at a time tb5, the first charge accumulation period T1 is ended, and the signal of the first sub pixel 201a is output to the signal line 502, so that the signal processing is performed in the column circuit 503. Furthermore, at a time tb8, the second charge accumulation period T2 is ended, and the signal of the first sub pixel 201a and the signal of the second sub pixel 201b are added to each other in the pixel 200, so that the signal processing is performed in the column circuit 503. The first charge accumulation period T1 and the second charge accumulation period T2 are overlapped with each other during a period tb1 to tb5 corresponding to parts of the respective periods.

Next, an operation of the (m−1)-th pixel row will be described. The reset operation of the first sub pixel 201a and the second sub pixel 201b of the pixel in the (m−1)-th pixel row is completed at a time ta1. Accordingly, a third charge accumulation period T3 corresponding to the charge accumulation period of the first sub pixel 201a and the second sub pixel 201b is started. It should be noted that the time ta1 is a time during a period in which an output operation in the (m−5)-th pixel row is performed. Subsequently, the third charge accumulation period T3 is ended at a time ta5, and the signals of the first sub pixel 201a and the second sub pixel 201b are added to each other, so that the signal processing is performed in the column circuit 503.

As described above, the pixel in the first pixel row 822 performs the processing on the signal generated during the first charge accumulation period T1 of the first sub pixel 201a by the column circuit 503. Thereafter, the processing on the signal generated during the second charge accumulation period T2 of the second sub pixel 201b included in the pixel where the signal processing of the first sub pixel 201a has been performed is performed by the column circuit 503.

In the second pixel row 823, the processing on the signal obtained by adding the signals of the first sub pixel 201a and the second sub pixel 201b generated during the third charge accumulation period T3 to each other is performed by the column circuit.

Figure 10A:
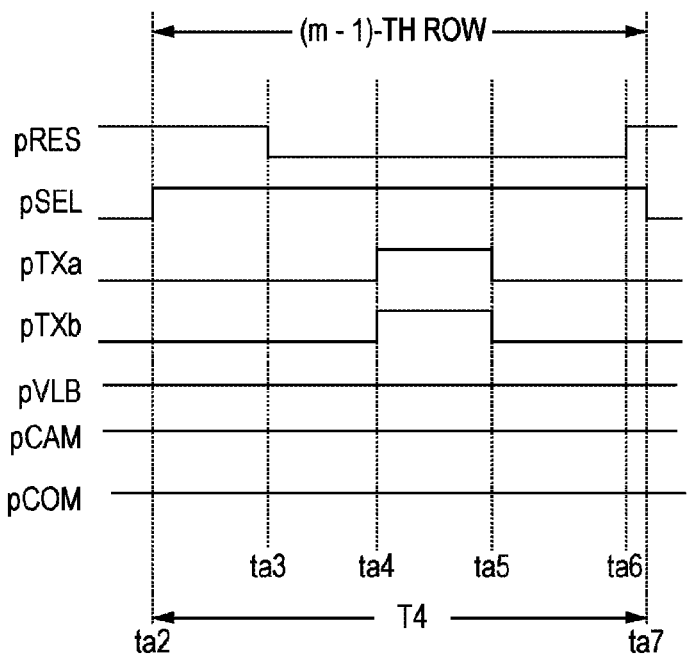
FIGS. 10A and 10B are timing charts of an output operation for pixel rows of the image pickup apparatus.
Figure 10B:
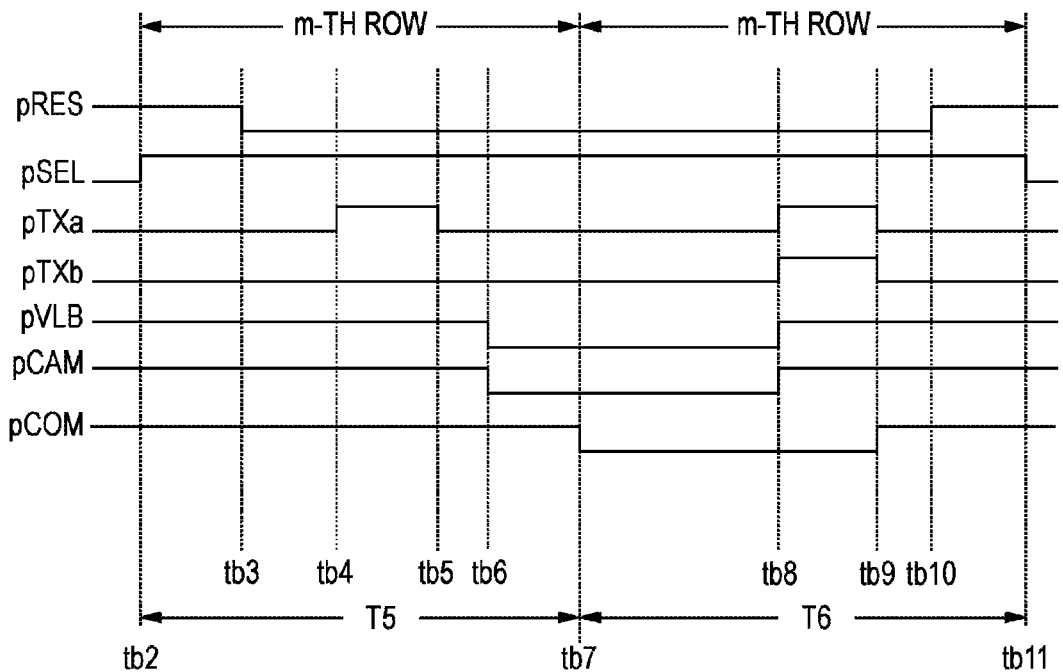

Next, the output operation will be described in detail with reference to FIGS. 10A and 10B. FIG. 10A illustrates the output operation in the second pixel row 823, and FIG. 10B illustrates the output operation in the first pixel row 822. The output period of the second pixel row 823 is set as T4. During the output period of the first pixel row 822, the output period of the signal of the first sub pixel 201a is set as T5, and the output period of the signal obtained by adding the signals of the first sub pixel 201a and the second sub pixel 201b to each other is set as T6.

The output operation in the (m−1)-th row as a representative of the second pixel row 823 will be described with reference to FIG. 10A.

At a time ta2, the driving signal pSEL turns to the High level to put the selection transistor 606 of the pixel 200 into the operating state. Thereafter, at a time ta3, the driving signal pRES turns to the Low level to put the reset transistor 605 into the non-operating state, and the reset operation of the FD 603 is completed. Then, a reset signal of the pixel 200 is output to the column circuit 503. During a period ta3 to ta4, the reset signal input to the column circuit 503 is amplified by the differential amplifier 703, and then the comparison with the reference signal is performed by the comparator 705. AD conversion is performed by using this comparison result, and a digital signal is held in the memory 506. The digital signal held herein is a reset signal N1 generated when the FD 603 is reset.

Next, a time ta4, the driving signals pTXa and pTXb turn to the High level to put the transfer transistors 602a and 602b into the operating state. With this operation, the charges accumulated in the photoelectric conversion unit 601a of the first sub pixel 201a and the charges accumulated in the photoelectric conversion unit 601b of the second sub pixel 201b are added to each other in the FD 603. At the time ta5, the transfer transistors 602a and 602b are put into the non-operating state. As described above, with this operation, the third charge accumulation period T3 is ended. Subsequently, the added signal is output to the column circuit 503 via the amplification transistor 604 and the selection transistor 606. Then, during a period ta5 to ta6, the signal input to the column circuit 503 is amplified by the differential amplifier 703 and is thereafter compared with the reference signal by the comparator 705. The AD conversion is performed by using this comparison result, and a digital signal is held in the memory 506. The digital signal held herein is a signal obtained by adding the signal of the first sub pixel 201a to the signal of the second sub pixel 201b during the third charge accumulation period T3 (hereinafter, will be referred to as the image signal AB).

Next, a time ta6, the driving signal pRES turns to the High level to put the reset transistor 605 into the operating state, and the FD 603 is reset again. Furthermore, at a time ta7, the driving signal pSEL turns to the Low level to end the pixel selection. At the same time, the signal processing in the column circuit 503 is ended.

Subsequently, the reset signal N1 and the image signal AB are transmitted to the signal processing circuit 508 by the horizontal scanning circuit 507, and a difference between the image signal AB and the reset signal N1 is obtained to obtain the image signal.

The operation processing of the pixel 200 in the region Region_c has been described above. During the illustrated periods, the driving signals pVLB, pCAM, and pCOM are maintained at the High level, and the amplification transistor 604, the differential amplifier 703, and the comparator 705 of the pixel 200 are in the operating state.

Next, the operation processing in the respective pixel rows in the region Region_i will be described with reference to FIG. 10B. As a representative of the first pixel row 822, the output operation in the m-th row will be described. FIG. 10B illustrates the output operation of the added signal of the first sub pixel 201a and the second sub pixel 201b after the output operation of the signal of the first sub pixel 201a.

Since an operation during a period tb2 to tb4 is similar to that during the period ta2-ta4 of FIG. 10A, descriptions thereof will be omitted.

At a time tb4, the signal processing on the reset signal N1 in the column circuit 503 is ended, and thereafter the driving signal pTXa turns to the High level to put the transfer transistor 602a into the operating state. At the time tb5, the driving signal pTXa turns to the Low level. With this operation, the first charge accumulation period T1 of the first sub pixel 201a is ended. Subsequently, the signal generated during the first charge accumulation period T1 in the first sub pixel 201a is output to the column circuit 503 via the amplification transistor 604 and the selection transistor 606.

Subsequently, the amplification processing is performed by the differential amplifier 703 during a period tb5 to tb6, and the amplified signal is supplied to the one of the input terminals of the comparator 705 via the switch 708. Furthermore, the switch 708 is turned off during the period tb5 to tb6, and the amplified signal is held in the sampling and holding capacitance 707.

At a time tb6, the driving signals pVLB and pCAM turn to the Low level to put the amplification transistor 604 and the differential amplifier 703 of the pixel 200 into the non-operating state. With this operation, the currents flowing through the amplification transistor 604 and the differential amplifier 703 are reduced, and it is possible to reduce the power consumption.

During a period tb6 to tb7, the comparator 705 compares the signal held in the sampling and holding capacitance 707 with the reference signal and performs the AD conversion by using the comparison result to hold a digital signal in the memory 506. The digital signal held herein is the signal of the first sub pixel 201a during the first charge accumulation period T1 (hereinafter, will be referred to as the image signal A).

At a time tb7, the signal processing in the column circuit 503 is ended, and the driving signal pCOM turns to the Low level to put the comparator 705 into the non-operating state. Subsequently, the horizontal scanning circuit 507 transmits the noise signal N1 and the image signal A of the first sub pixel 201a to the signal processing circuit 508, and a difference is obtained to obtain a first focus detection signal.

Next, at the time tb8, the driving signals pTXa and pTXb turn to the High level, and at a time tb9, the driving signals pTXa and pTXb turn to the Low level. With this operation, an addition signal obtained by adding the signal of the second sub pixel 201b generated during the second charge accumulation period T2 to the signal of the first sub pixel 201a generated during the first charge accumulation period T1 is generated.

Furthermore, at the time tb8, the driving signals pVLB and pCAM turn to the High level to put the amplification transistor 604 and the differential amplifier 703 into the operating state. Subsequently, the addition signal of the first sub pixel 201a and the second sub pixel 201b is output to the column circuit 503 via the amplification transistor 604 and the selection transistor 606. Subsequently, at the time tb9, the driving signal pCOM turns to the High level to put the comparator 705 into the operating state.

During a period tb9 to tb10, the comparator 705 compares the signal held in the sampling and holding capacitance 707 with the reference signal and performs the AD conversion by using the comparison result to hold a digital signal in the memory 506. The digital signal held herein is the addition signal of the first sub pixel 201a and the signal of the second sub pixel 201b during the second charge accumulation period T2 (hereinafter, will be referred to as the image signal AB).

Next, at a time tb10, the driving signal pRES turns to the High level to put the reset transistor 605 into the operating state, and the FD 603 is reset again. Furthermore, at the time tb10, the driving signal pSEL turns to the Low level to end the selection of the pixel 200 is ended. At the same time, the signal processing in the column circuit 503 is also ended.

The horizontal scanning circuit 507 transmits the reset signal N1 and the image signal AB corresponding to the addition signal of the first sub pixel 201a and the second sub pixel 201b to the signal processing circuit 508. Subsequently, a difference between the signal of the first sub pixel 201a and the signal obtained by adding the signals of the first sub pixel and the second sub pixel 201b to each other is obtained to obtain a focus detection signal.

The output operations in the respective rows of the pixel 200 in the region Region_i have been described above. Accordingly, the signal of the first sub pixel 201a and the signal of the second sub pixel 201b are output.

In one embodiment, a feature in the operation of FIG. 10B resides in that a duration of the period tb5 to tb6 is long. In a case where the image signal A for the normal focus detection is obtained, and thereafter the image signal AB for the image generation is obtained, a period tb5 to tb8 is shortened, and the reset signal N1, the image signal A, and the image signal AB are read out during one horizontal scanning period because the signals can be read out at a high speed. However, when the above-described operation is performed, a length of the charge accumulation period in the pixel row where the signal for the focus detection is not read out may be different from that in the pixel row where the signal for the focus detection is read out in some cases. Therefore, when the period tb5 to tb8 is lengthened as in the present example, variations in the charge accumulation periods can be suppressed. However, the above-described operation is actually performed, since the period tb5 to tb8 is lengthened, there is a fear that an issue of an increase in the power consumption used in the column circuit 503 may occur.

In view of the above, as illustrated in the present example, the column circuit is put into the mode in which the power consumption in the column circuit during the period tb5 to tb8 is smaller than that in the normal operating state.

For example, the differential amplifier 703 is put into the non-operating state at the time tb6 but may be put into the non-operating state at an arbitrary time after the signal processing in the differential amplifier 703 is ended and before the signal processing on the image signal AB is started. At the same time, at the time tb6, the amplification transistor 604 is put into the non-operating state but these timings may be shifted from one another.

Furthermore, the comparator 705 is put into the non-operating state at the time tb7 but may be put into the non-operating state in at least part of the period after the signal processing in the comparator 705 is ended. For example, the comparator 705 can be put into the non-operating state after the holding in the memory 506 is performed.

It should be noted that the configuration of the column circuit 503 is not limited to the configuration of the present example. Herein, the configuration is adopted in which both the differential amplifier 703 and the comparator 705 used in the AD conversion circuit are arranged in the column circuit 503, but a configuration may also be adopted in which only one of those is arranged. The same also applies to the following example.

For example, in the configuration in which only the analog-to-digital conversion circuit is arranged, the signal output from the signal line 502 is input to the comparator 705 via the sampling and holding capacitance 707. It should be noted that, with regard to the output operation, the operation of the differential amplifier 703 may be omitted from the drawings of the output operations illustrated in FIGS. 10A and 10B. At the time tb7, the driving signal pCOM turns to the Low level to establish the non-operating state after the AD conversion is ended.

A configuration in which only the differential amplifier 703 is arranged may also be adopted.

As described above, according to the present example, the power consumption used in the obtainment of the signal for the focus detection is reduced, and the image having a satisfactory image quality can be obtained while the focus detection operation is performed.

Example 2

A difference of the present example from Example 1 resides in that, when signals of the respective pixel rows are read out in two pixel rows, parts of output periods of mutual adjacent pixel rows are overlapped with each other. Accordingly, the signal output time of the image pickup device 106 is shortened. Hereinafter, the difference from Example 1 will be mainly described.

Figure 11A:
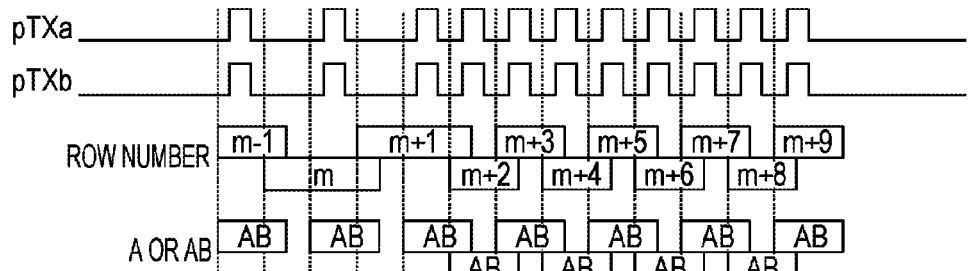
FIGS. 11A, 11B, and 11C are timing charts of the rolling shutter operation of the image pickup apparatus.
Figure 11B:
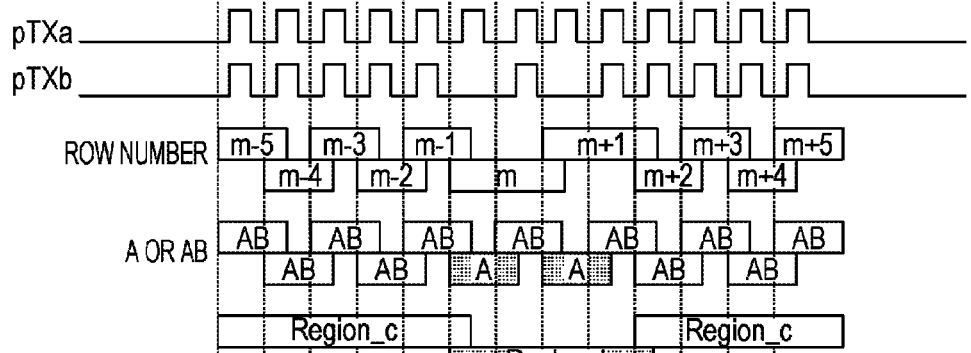
Figure 11C:
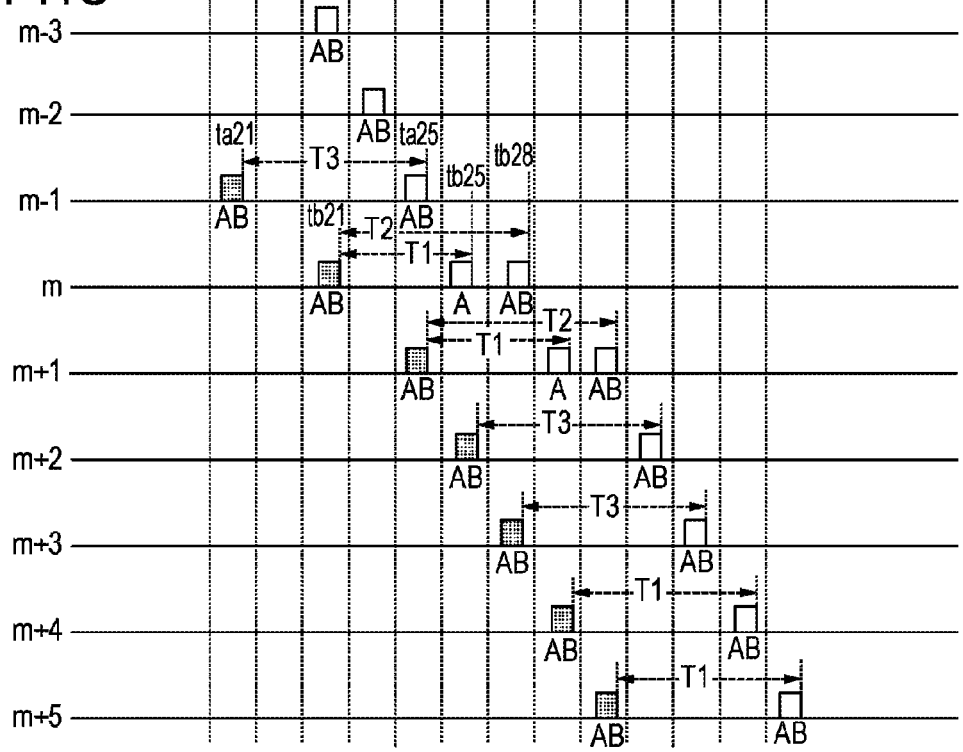

With reference to FIGS. 11A, 11B, and 11C, according to the present example too, the charge accumulation period is controlled by the rolling shutter operation. In FIGS. 11A, 11B, and 11C, when attention is focused on a predetermined pixel row such as, for example, an (m−2)-th row, part of the output period in the (m−2)-th row is overlapped with part of the output period in the (m−1)-th row. Furthermore, other part of the output period in the (m−2)-th row is overlapped with part of the output period in the (m−3)-th row. Specifically, the periods are overlapped with each other while, during the horizontal scanning period in the previous row, the processing in the column circuit in the next row is started. In the first pixel row 822, the processing in the column circuit 503 of the image signal AB is started during the horizontal scanning period of the image signal A, so that the output periods are overlapped with each other.

The operation of the m-th pixel row will be described as a representative of the first pixel row 822, and the operation of the (m−1)-th pixel row will be described as a representative of the second pixel row 823.

The reset operation of the first sub pixel 201a and the second sub pixel 201b included in the pixel in the m-th pixel row is completed at a time tb21, and the charge accumulation period is started.

At a time tb25, the signal generated during the first charge accumulation period T1 in the first sub pixel 201a is transferred. Subsequently, at a time tb28, the signal generated during the second charge accumulation period T2 in the second sub pixel 201b is transferred. Furthermore, at the time tb28, the signal generated in the first sub pixel 201a is transferred, so that, during a period after the end of the first charge accumulation period T1 until the end of the second charge accumulation period T2, the signal generated in the first sub pixel 201a is transferred. In a case where the signal generated in the first charge accumulation period T1 of the first sub pixel 201a is held in the amplification transistor 604, the image signal AB can be obtained.

Next, the operation in the (m−1)-th pixel row will be described. The reset operation of the first sub pixel 201a and the second sub pixel 201b the pixel in the (m−1)-th pixel row is completed at a time ta21, and the third charge accumulation period T3 is started. Subsequently, at a time ta25, the signals of the first sub pixel 201a and the second sub pixel 201b are transferred, and the third charge accumulation period T3 is ended. The signals generated during the third charge accumulation period T3 in the first sub pixel 201a and the second sub pixel 201b are added to each other to obtain the image signal AB.

Figure 12:
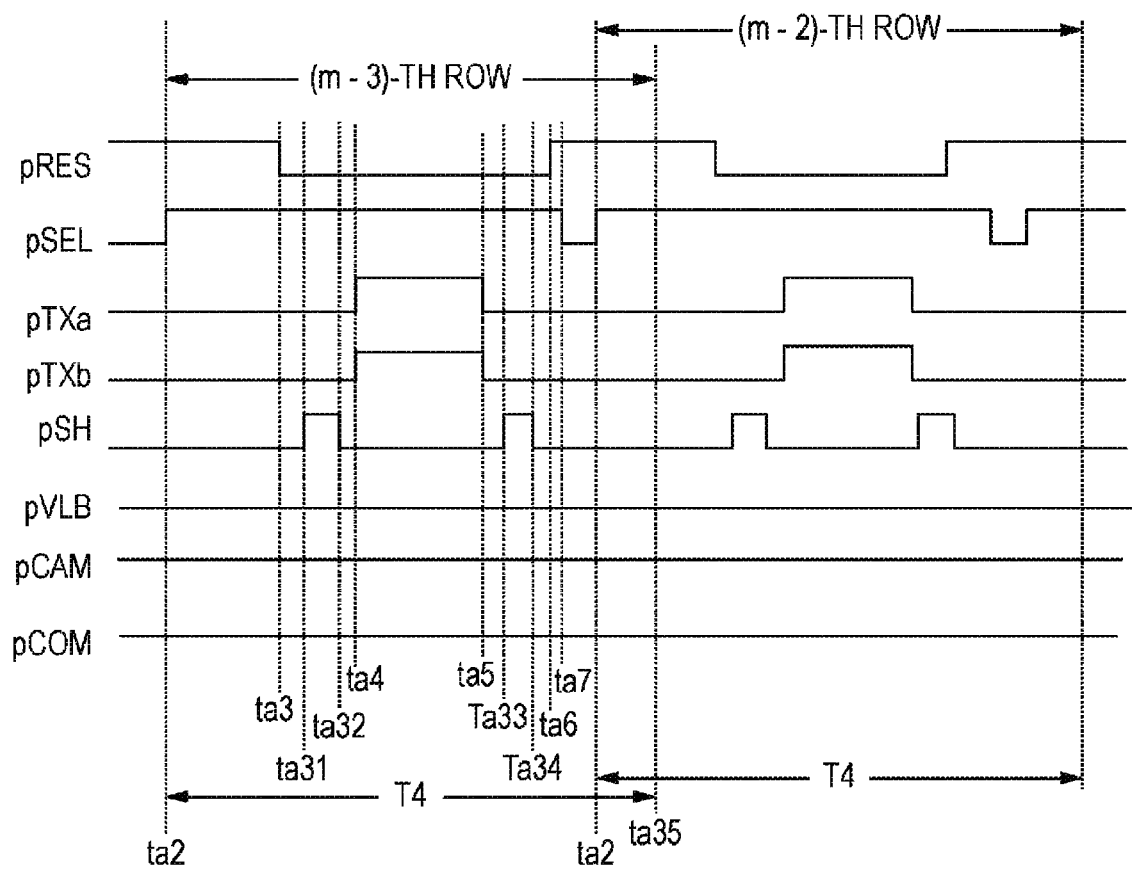
FIG. 12 is a timing chart of the output operation for the pixel rows of the image pickup apparatus.

Next, the output operation in the second pixel row 823 will be described with reference to FIG. 12. A difference from FIGS. 10A and 10B will be mainly described. Components similar to those in FIGS. 10A and 10B are assigned with the similar reference symbols, and descriptions thereof will be omitted.

The operations in the (m−3)-th pixel row and the (m−2)-th pixel row as a representative of the second pixel row 823 will be described. It should be noted that the column circuit 503 and the amplification transistor 604 remain in the operating state during the illustrated period.

The driving signal pSH turns from the Low level to the High level at a time ta31 and turns from the High level to the Low level at a time ta32. With this operation, the signal after being amplified by the differential amplifier 703 is held in the sampling and holding capacitance 707.

Thereafter, during at least part of a period ta32 to ta33, the AD conversion processing of the reset signal N1 is performed. The driving signal pSH turns from the Low level to the High level at a time ta33 and turns from the High level to the Low level at a time ta34. With this operation, the addition signal of the first sub pixel 201a and the second sub pixel 201b after being amplified by the differential amplifier 703 is held in the sampling and holding capacitance 707.

Thereafter, the AD conversion processing of the image signal AB is performed during at least part of a period ta34 to ta35, and the signal processing of the signal in an (n−3)-th pixel row in the column circuit 503 is ended at a time ta35. The time ta35 is a time after the time ta2 at which the selection transistor 606 of the pixel in the (m−2)-th pixel row where the signal readout is performed next is put into a conductive state. This state corresponds to a state in which the output period of the signal of the pixel in the (m−3)-th pixel row is overlapped with the output period of the signal of the pixel in the (m−2)-th pixel row. The horizontal scanning period in the (m−3)-th pixel row is established at the time ta35 and subsequent times, and this horizontal scanning period is also overlapped with the output period in the (m−2)-th pixel row. As an alternative to the above-described configuration, only the horizontal scanning period in the (m−3)-th pixel row may be overlapped with the output period in the (m−2)-th pixel row.

The output operations in the respective rows of the pixels 200 in the region Region_c have been described above. Accordingly, the image forming signal is read out.

Figure 13:
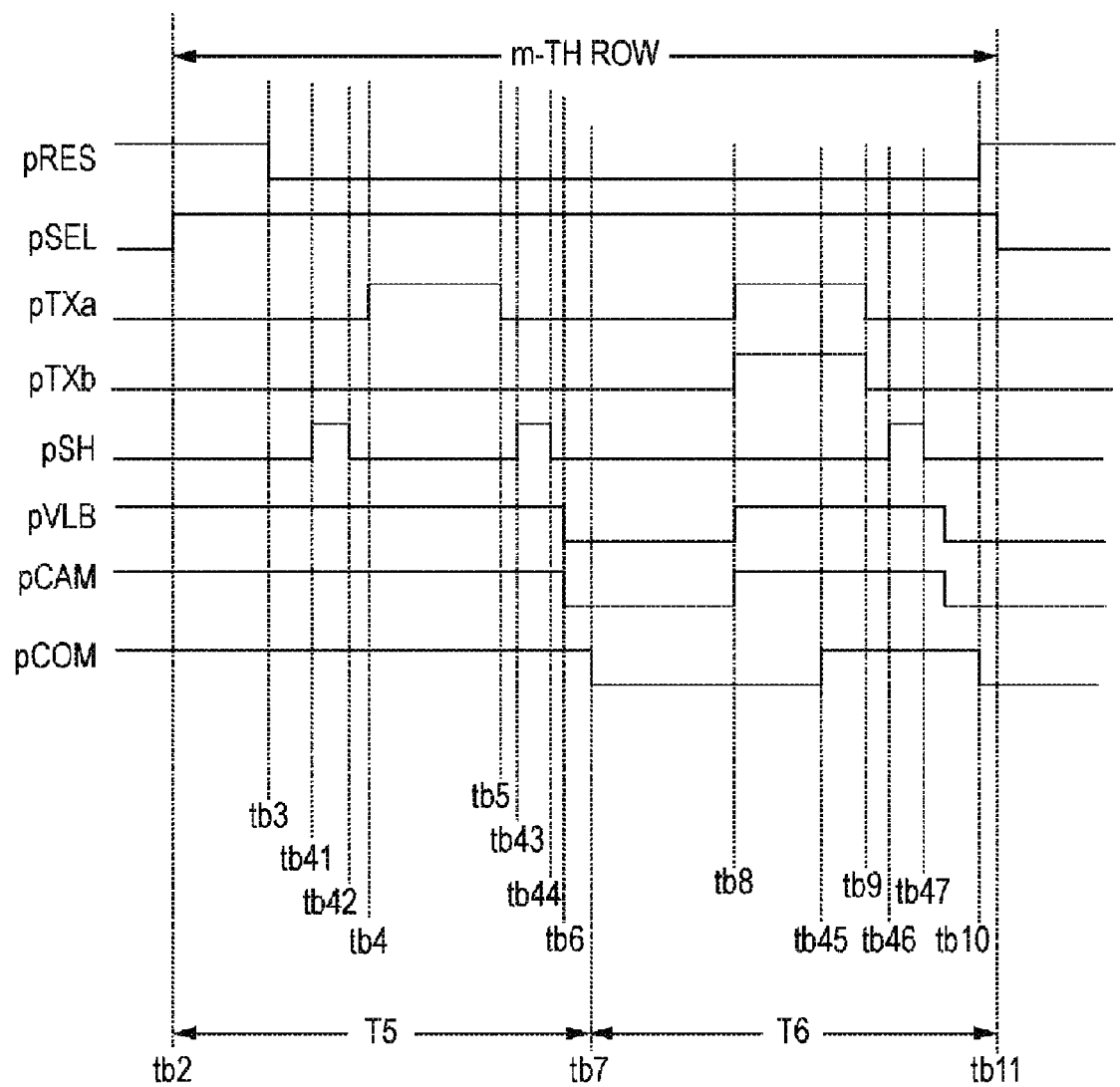
FIG. 13 is a timing chart of the output operation for the pixel rows of the image pickup apparatus.

Subsequently, the output operations in the respective pixel rows in the region Region_i will be described with reference to FIG. 13. A difference from FIGS. 10A and 10B will be mainly described. Components similar to those in as FIGS. 10A and 10B are assigned with similar reference symbols, and descriptions thereof will be omitted.

The driving signal pSH turns from the Low level to the High level at a time tb41 and turns from the High level to the Low level at a time tb42. With this operation, the signal after being amplified by the differential amplifier 703 is held in the sampling and holding capacitance 707.

Thereafter, the AD conversion processing of the reset signal N1 is performed during at least part of a period tb42 to tb43. The driving signal pSH turns from the Low level to the High level at a time tb43 and turns from the High level to the Low level a time tb44. With this operation, the addition signal of the first sub pixel 201a and the second sub pixel 201b after being amplified by the differential amplifier 703 is held in the sampling and holding capacitance 707.

Thereafter, the AD conversion processing of the image signal A is performed during at least part of a period tb44-tb7, and the signal processing in the column circuit 503 is ended at the time tb7. In addition, at the time tb7, the driving signal pCOM turns from the High level to the Low level.

Subsequently, at a time tb45, the driving signal pCOM turns from the Low level to the High level. Thereafter, the driving signal pSH turns from the Low level to the High level at a time tb46 and turns from the High level to the Low level at a time tb47. With this operation, the addition signal of the first sub pixel 201a and the second sub pixel 201b after being amplified by the differential amplifier 703 is held in the sampling and holding capacitance 707.

A period from the time tb7 and subsequent times corresponds to the horizontal scanning period of the image signal A. This horizontal scanning period is overlapped with the output period of the image signal AB.

According to the present example too, since the current source 701 from which the bias current is supplied to the amplification transistor 604 and the differential amplifier 703 are put into the non-operating state during a period tb6 to tb8, the power consumption is reduced. Furthermore, since the comparator 705 is put into the non-operating state during a period tb7 to tb45, the power consumption is reduced.

The present invention has been described by way of the specific examples, but the present invention can be appropriately modified and combined without departing from the concept thereof.

For example, the configuration including the differential amplifier and the AD conversion unit as the column circuit has been described according to the examples but is not limited to this. Furthermore, a noise reduction unit or a digital signal processing unit may also be provided. A configuration may also be adopted in which only one of the differential amplifier and the AD conversion unit is provided.

It should be noted that, according to the examples of the present invention, the image signal AB is obtained in the first pixel row 822, but only the signal of the second sub pixel 201b may be obtained to be used as the focus detection signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102132, filed May 19, 2015, which is hereby incorporated by reference herein in its entirety.

What is claimed is:

1. A driving method for an image pickup apparatus that includes
   pixel columns each including pixels each including a first sub pixel and a second sub pixel, the first sub pixel and the second sub pixel each including a photoelectric conversion unit,
   amplification portions each configured to process a signal generated at the photoelectric conversion units of a corresponding pixel, the method comprising:
   accumulating a signal generated during a first charge accumulation period by the first sub pixel;
   accumulating a signal generated during a second charge accumulation period partially overlapped with the first charge accumulation period by the second sub pixel; and
   controlling the amplification portions such that
   after processing of the signal generated during the first charge accumulation period is performed, processing of the signal is performed which is generated during the second charge accumulation period of the second sub pixel included in the pixel where the signal processing of the first sub pixel is performed, and
   a bias current flowing through each of the amplification portions is reduced after the processing of the signal generated during the first charge accumulation period is ended and before the second charge accumulation period is ended.

2. The driving method for the image pickup apparatus according to claim 1,
   wherein the amplification portions are maintained in the non-operating state during a period from a time when the processing of the signal of the first sub pixel in the amplification portions is ended to a time when at least the second charge accumulation period is ended.

3. The driving method for the image pickup apparatus according to claim 1, wherein after the processing of the signal generated during the first charge accumulation period is performed, a signal obtained by adding a signal generated during the second charge accumulation period of the first sub pixel to a signal generated during the second charge accumulation period of the second sub pixel included in the pixel where the signal processing of the first sub pixel is performed is output.

4. The driving method for the image pickup apparatus according to claim 1, wherein
   each of the amplification portions are amplification units to each of which a signal output from a corresponding one of signal lines is input.

5. The driving method for the image pickup apparatus according to claim 1, wherein the amplification portions are amplification units to each of which a signal output from a corresponding one of signal lines is input, and wherein the image pickup apparatus further comprises analog-to-digital conversion units to each of which a signal output from a corresponding one of the amplification units is input, and wherein the bias current flowing through the amplification unit and a bias current flowing through the analog-to-digital conversion unit are reduced after analog-to-digital conversion processing of the signal generated during the first accumulation period is ended.

6. The driving method for the image pickup apparatus according to claim 1, wherein in a first pixel row, after the processing of the signal generated during the first charge accumulation period of the first sub pixel is performed, the processing of the signal is performed which is generated during the second charge accumulation period of the first sub pixel and the second sub pixel included in the pixel where the signal processing of the first sub pixel is performed, wherein in a second pixel row, processing of a signal obtained by adding signals of the first sub pixel and the second sub pixel which are generated during a third charge accumulation period to each other is performed, and wherein duration of the second charge accumulation period is the same as a duration of the third charge accumulation period.

7. The driving method for the image pickup apparatus according to claim 1, wherein each of the amplification portions including:

an amplification transistor included in a corresponding one of the pixels, and a current source connected to the amplification transistor through a switch, and wherein the amplification portion is put into the non-selecting state by putting the switch into an off state.

8. The driving method for the image pickup apparatus according to claim 1, wherein the amplification portions are amplification units to each of which a signal output from a corresponding one of signal lines is input, and wherein the image pickup apparatus comprises analog-to-digital conversion units to each of which a signal output from a corresponding one of the amplification units is input, and wherein the current flowing through the analog-to-digital conversion unit is reduced after a current flowing through the amplification unit is reduced.

9. A driving method for an image pickup apparatus that includes pixel columns each including pixels each including a first sub pixel and a second sub pixel, the first sub pixel and the second sub pixel each including a photoelectric conversion unit, and an analog-to-digital conversion units each configured to process a signal generated at the photoelectric conversion unit of a corresponding pixels, the method comprising:

accumulating a signal generated during a first charge accumulation period by the first sub pixel;

accumulating a signal generated during a second charge accumulation period partially overlapped with the first charge accumulation period by the second sub pixel; and controlling the analog-to-digital conversion units such that after processing of the signal generated during the first charge accumulation period is performed, processing of the signal is performed which is generated during the second charge accumulation period of the second sub pixel included in the pixel where the signal processing of the first sub pixel is performed, and a bias current flowing through each of the analog-to-digital conversion units is reduced after analog-to-digital conversion processing of the signal generated during the first charge accumulation period is ended and before the second charge accumulation period is ended.

10. The driving method for the image pickup apparatus according to claim 9, wherein after the processing of the signal generated during the first charge accumulation period is performed, a signal obtained by adding a signal generated during the second charge accumulation period of the first sub pixel to a signal generated during the second charge accumulation period of the second sub pixel included in the pixel where the signal processing of the first sub pixel is performed is output.

11. The driving method for the image pickup apparatus according to claim 9, wherein in a first pixel row, after the processing of the signal generated during the first charge accumulation period of the first sub pixel is performed, the processing of the signal is performed which is generated during the second charge accumulation period of the first sub pixel and the second sub pixel included in the pixel where the signal processing of the first sub pixel is performed, wherein in a second pixel row, processing of a signal obtained by adding signals of the first sub pixel and the second sub pixel which are generated during a third charge accumulation period to each other is performed, and wherein duration of the second charge accumulation period is the same as a duration of the third charge accumulation period.

12. A driving method for an image pickup apparatus that includes pixel columns each including pixels each including a first sub pixel and a second sub pixel, the first sub pixel and the second sub pixel each including a photoelectric conversion unit, column circuits each configured to process a signal output from the photoelectric conversion units of the pixels included in a different one of the pixel columns, and amplification portions configured to process a signal generated at the photoelectric conversion units of a corresponding pixel, and analog-to-digital conversion units to each of which a signal output from a corresponding one of the amplification portions is input, the method comprising:

accumulating a signal generated during a first charge accumulation period by the first sub pixel;

accumulating a signal generated during a second charge accumulation period partially overlapped with the first charge accumulation period by the second sub pixel; and controlling the analog-to-digital conversion units such that after processing of the signal generated during the first charge accumulation period is performed, processing of the signal is performed which is generated during the second charge accumulation period of the second sub pixel included in the pixel where the signal processing of the first sub pixel is performed, and a bias current flowing through each of the analog-to-digital conversion units is reduced after the processing of the signal generated during the first charge accumulation period is ended, also after a bias current flowing through a corresponding one of the amplification portions is reduced and before the second charge accumulation period is ended.

13. The driving method for the image pickup apparatus according to claim 12, wherein after the processing of the signal generated during the first charge accumulation period is performed, a signal obtained by adding a signal generated during the second charge accumulation period of the first sub pixel to a signal generated during the second charge accumulation period of the second sub pixel included in the pixel where the signal processing of the first sub pixel is performed is output.

14. The driving method for the image pickup apparatus according to claim 12, wherein each of the amplification portions are amplification units to each of which a signal output from a corresponding one of signal lines is input.

15. The driving method for the image pickup apparatus according to claim 12,
wherein in a first pixel row, after the processing of the signal generated during the first charge accumulation period of the first sub pixel is performed, the processing of the signal is performed which is generated during the second charge accumulation period of the first sub pixel and the second sub pixel included in the pixel where the signal processing of the first sub pixel is performed,
wherein in a second pixel row, processing of a signal obtained by adding signals of the first sub pixel and the second sub pixel which are generated during a third charge accumulation period to each other is performed, and
wherein duration of the second charge accumulation period is the same as a duration of the third charge accumulation period.

16. The driving method for the image pickup apparatus according to claim 12,
wherein each of the amplification portions including;
an amplification transistor included in a corresponding one of the pixels; and
a current source connected to the amplification transistor through a switch, and
wherein, in each of the amplification portions, the current flowing through the amplification portion is reduced by putting the switch into an off state.

17. The driving method for the image pickup apparatus according to claim 12,
after the current flowing through the analog-digital conversion unit is reduced, the current flowing through the amplification portion is increased before the current flowing through the analog-to-digital conversion unit is increased.

* * * * *